April 12, 1960  A. E. LE VAN  2,932,503
SPRINGS
Filed Aug. 28, 1956
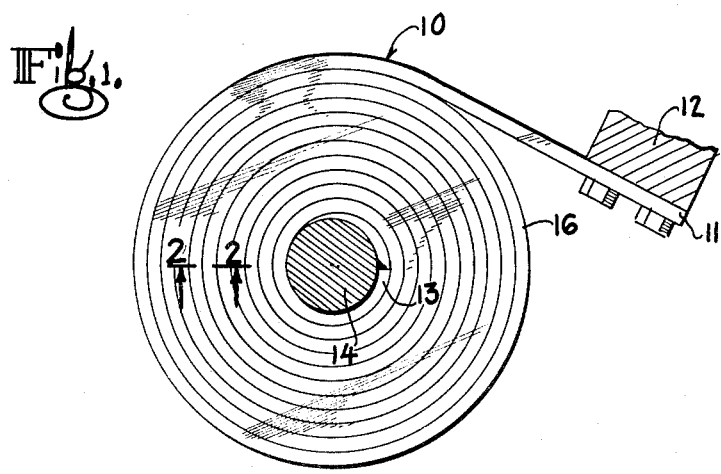
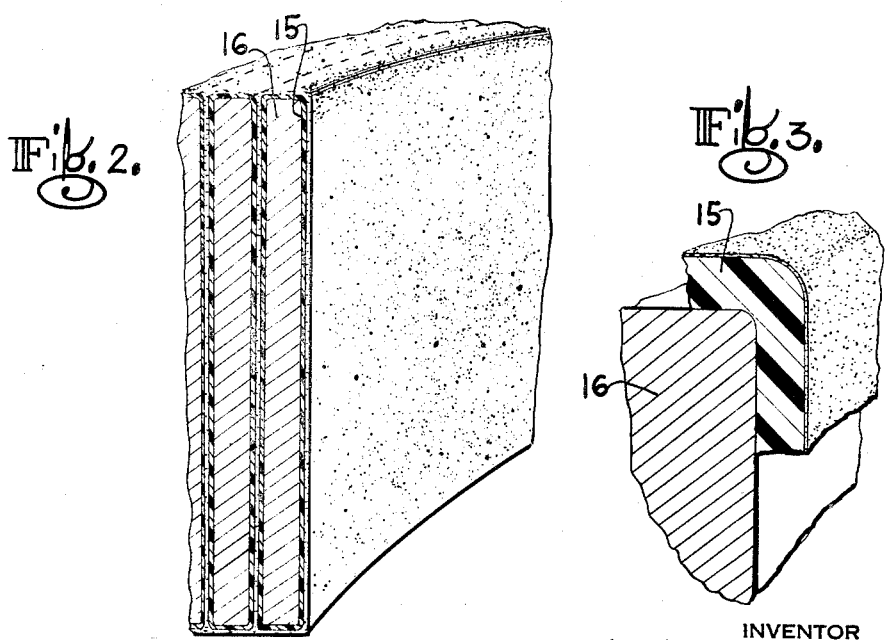
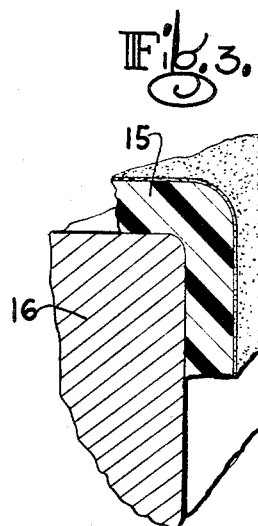
INVENTOR
Ambrose E. Le Van
BY
Pollard Johnston Smyth & Robertson
ATTORNEYS

2,932,503
SPRINGS

Ambrose E. Le Van, Sellersville, Pa., assignor to American Machine and Metals, Inc., New York, N.Y. a corporation of Delaware Application August 28, 1956, Serial No. 606,647

1 Claim. (Cl. 267—1)

This invention relates to springs and particularly to a spring which has been energized or wound and from which smooth release of energy is desired.

In springs for spring actuated motors, especially spiral springs where the turns are in contact with each other when tightly wound, friction between the interleaving or adjacent turns will cause non-uniform torque, especially when released and at the start of unrolling or deenergization thereof. As a result, the spring will not deliver the full inherent power of the material of which it is made because of said friction. The same difficulty also exists in the case of an energized helical spring encased in a tube or holding means arranged so that when the spring elongates upon release, the surfaces of the spring and tube will rub. Examples of spiral springs wherein this problem exists will be found in clocks and cameras and also in devices such as parachute release mechanisms, the latter having a spring which must be unusually heavy in order to obtain maximum power for opening a parachute when the mechanism is tripped.

In spiral springs, the unrolling of the first few turns becomes of major importance because the friction between the turns is highest at this time. Just after release, impact forces may be developed when the load is suddenly engaged, such resulting in erratic torque delivery.

Use of oil on the spring is not satisfactory because a suction tight film may be developed which will prevent quick release of energy. Another problem in prior film lubricants for spiral type or formed springs is their inability to withstand the heat required for stress relieving after forming. Spring steel elements normally must be stress relieved. Further, some surface lubricants are prone to flake off with resultant unsatisfactory functioning of the spring.

One object of the invention is to provide an improved lubricating means for a spiral or similar type spring.

A still further object of the invention is to provide a method of making a spring so that it will have uniform operating characteristics.

In one aspect of the invention, the flat spring strip has formed thereon a thin coating of polytetrafluoroethylene. The coating can be that sold on the market under the trademark "Teflon." The coating may be applied in a thin coat by spraying or by an extrusion process. The thickness of the material should be controlled so that it is very thin, for example, in the range of .0002" to .0007". If it is not controlled as to thickness, too much cold flow under the pressure of a fully wound spring might occur.

In a first aspect of the invention, after the spring is coated, it can be coiled in a spiral or helical form. In such forming, it may be deformed beyond the elastic limit so that the spring will remain in the desired spiral or formed condition. The spring then must be stress relieved at a temperature of above 300° F. and below 540° F., such depending upon the metal and working.

The coating of polytetrafluoroethylene on said spring has friction characteristics which may be referred to as "ice on ice." When such a spring is tightly wound and then released, it has been found that full and uniform torque will be exerted substantially from the beginning of the release of the spring. The coating also will assist in reducing susceptibility to corrosion.

In a still further aspect of the invention, the surface texture of the polytetrafluoroethylene is such that it will accept dry lubricants, such as graphite, molybdenum disulphide or other similar compounds. The molybdenum disulphide may be that known and sold under the trademark "Molykote." These compounds when placed on cold rolled finishes normally will tend to flake off, but when placed on polytetrafluoroethylene, will remain thereon and assist in reducing the friction between turns of the spiral spring or between the spring and its holder.

These and other objects, advantages and features of the invention will become apparent from the following description and drawings which are merely exemplary.

In the drawings:

Fig. 1 shows one form of the spring;

Fig. 2 is an enlarged view looking in the direction 2—2 of Fig. 1; and

Fig. 3 is an enlarged corner view of Fig. 2.

A spiral type spring is seen in Fig. 1, spring 10 having its outer end 11 fastened to a suitable anchor 12. The center end of the spring 13 can be fastened to the winding and force output shaft 14. The spring may be of any suitable material, such as spring steel, "Ni-span-C" or other suitable spring metal.

The flat strip 16 of which the spring is to be made first has placed thereon a coating 15 of polytetrafluoroethylene, said coating being sprayed or extruded thereon.

The spring then can be coiled or formed to the shape illustrated in Fig. 1, the coiling action may be such as to cause the material to pass its elastic limit so that it will stay in a coiled form. Such a spring then must be subjected to a stress relieving heat treatment, such being carried out, for example, at a temperature of between about 300° to 500° F.

As one example, if stainless steel having about 16% chromium and about 6 to 8% nickel is used, the stress relieving temperature may be 350° to 400° F. for ½ hour.

If a further lubricant is desired, the polytetrafluoroethylene coating is found to be receptive to molybdenum disulphide which can be applied thereto before heat treating. Alternatively, graphite or other similar lubricants can be put on the surface.

The invention herein can be used for various types of springs for producing maximum torque or reducing friction between parts. It should be apparent that variations may be made in the details thereof without departing from the spirit of the invention except as defined in the appended claim.

What is claimed is:

A spiral metal spring adapted to be energized and having surfaces in contact with other surfaces when in energized condition, a polytetrafluoroethylene coating on all of the contacting surfaces of said spring so as to provide polytetrafluoroethylene to polytetrafluoroethylene contact between all of said contacting surfaces, and a lubricant on said coating.

References Cited in the file of this patent

UNITED STATES PATENTS

| 151,638 | Weiden | June 2, 1874 |
| 1,676,596 | Wittel | July 10, 1928 |
| 1,967,088 | Geyer | July 17, 1934 |
| 1,977,458 | Stargardter | Oct. 16, 1934 |
| 2,667,347 | Jacobs | Jan. 26, 1954 |
| 2,801,100 | Crites | July 30, 1957 |

FOREIGN PATENTS

| 510,979 | Canada | Mar. 15, 1955 |